United States Patent [19]

Amjad et al.

[11] Patent Number: 4,707,271

[45] Date of Patent: * Nov. 17, 1987

[54] STABILIZATION OF IRON IN AQUEOUS SYSTEMS

[75] Inventors: Zahid Amjad, Avon Lake; William F. Masler, III, Hinckley, both of Ohio

[73] Assignee: The B. F. Goodrich Company, Akron, Ohio

[ * ] Notice: The portion of the term of this patent subsequent to Jan. 28, 2003 has been disclaimed.

[21] Appl. No.: 793,815

[22] Filed: Nov. 1, 1985

[51] Int. Cl.$^4$ ................................................. C02F 5/12
[52] U.S. Cl. ..................................... 210/701; 252/180
[58] Field of Search ............................... 210/698–701; 252/180, 181

[56] References Cited

U.S. PATENT DOCUMENTS

| | | | |
|---|---|---|---|
| 4,361,492 | 11/1982 | Dubin | 210/701 |
| 4,386,005 | 5/1983 | Kapiloff et al. | 252/180 |
| 4,387,027 | 6/1983 | May et al. | 210/701 |
| 4,431,547 | 2/1984 | Dubin | 210/701 |
| 4,432,884 | 2/1984 | Kawasaki et al. | 210/701 |
| 4,434,059 | 2/1984 | Johnson et al. | 210/701 |
| 4,532,046 | 7/1985 | Meunier et al. | 210/698 |
| 4,566,973 | 1/1986 | Masler et al. | 210/701 |

*Primary Examiner*—Peter Hruskoci
*Attorney, Agent, or Firm*—George A. Kap; Alan A. Csontos

[57] ABSTRACT

The copolymers are effective in stabilizing iron in solution and as antiscalants in the presence of soluble iron, the copolymers are used in amount of 1 to 200 ppm, have molecular weight of about 1,000 to 50,000, and are prepared by polymerizing 40 to 95 weight parts of an acrylic acid with 5 to 60 weight parts of a substituted acrylamide.

12 Claims, No Drawings

STABILIZATION OF IRON IN AQUEOUS SYSTEMS

BACKGROUND OF THE INVENTION

Citric acid, gluconic acid, and other materials have been used in the past to stabilize iron in solution and thus prevent its precipitation in forms such as ferric hydroxide and ferric oxide, wherein iron is in the third oxidation state. Citric acid and such materials effectively maintain iron in solution by forming complexes therewith which are soluble in water and thereby, remain dissolved in water. Although citric acid and cognate materials are effective as solubilizing agents for iron in solution, they are not antiscalants and are ineffective against scale such as calcium carbonate, calcium phosphate, calcium sulfate, magnesium hydroxide, and the like.

U.S. patent application entitled "Scale Inhibition In Water Systems" filed on Aug. 6, 1984, and bearing Ser. No. 638,158, was filed for inventors Amjad and Masler. That application matured into U.S. Pat. No. 4,566,973 which issued Jan. 28, 1986. U.S. Pat. No. 4,556,973 discloses the use of copolymers of an acrylic acid and a substituted acrylamide in an aqueous medium to reduce or inhibit precipitation of scale, particularly phosphate scale, by threshold inhibition. That application discloses effectiveness of the copolymers against calcium phosphate, calcium carbonate, calcium sulfate, and magnesium hydroxide. At middle of page 5 of that application, other scale or precipitates are noted, including iron oxide.

It should be understood that the iron oxide referred to in U.S. Pat. No. 4,566,973 is in a solid, particulate form and that the function of the copolymers relative to iron oxide, and like materials, is that of suspending agents. The function of such suspending agents is to disperse and maintain the iron oxide particles dispersed so that they do not precipitate or deposit on internal surfaces of equipment containing the aqueous medium. The invention herein pertains to the use of same and similar copolymers to maintain solubilized ferric ions in solution so that they do not form precipitates which would deposit on surfaces of equipment. The copolymers function as stabilizing agents towards soluble iron or ferric ions and maintain such ions in solution.

SUMMARY OF THE INVENTION

This invention pertains to the use of copolymers of an acrylic acid and a substituted acrylamide for the purpose of stabilization of iron in solution. This is accomplished by adding the copolymer to an aqueous medium maintained at pH of above 5 whereby the soluble iron is maintained in the solution. This invention is also directed to the use of the copolymers in aqueous medium containing a small amount of soluble iron to inhibit formation of alkaline earth scale. The copolymers useful herein are water-soluble copolymers of 40 to 95 weight parts of an acrylic acid with 5 to 60 weight parts of a substituted acrylamide, based on the total of 100 weight parts of the monomers. Amount of the copolymers used can vary from about 1 to 500 ppm.

DETAILED DESCRIPTION OF THE INVENTION

Ferrous ion, which is soluble in an aqueous medium, is oxidized to the ferric ion. At a low pH of up to abut 3 to 4, the ferric ion is also soluble in an aqueous medium but at pH of about 5 and above, it precipitates out in the form of iron hydroxide, i.e., $Fe(OH)_3$, or iron oxide, i.e. $Fe_2O_3$, and other iron compounds where the iron has an oxidation state of three, hereinafter referred to as iron (III).

Fouling by iron compounds such as iron oxide, iron silicates, and the like, is a constant threat to the efficient operation of industrial systems. Iron can originate in the feed water or can develop within the system through the corrosion of pipes and metal equipment. It is known that trace amounts of iron (III) on the order of 1–5 ppm, when present in a recirculating system, can adversely affect the performance of scale control agents such as polyacrylates, polymethacrylates, copolymers of acrylic acid and vinyl acetate, and the like. Although an aqueous system containing iron (III) in solution can be stabilized by the use of chelating agents such as citric acid, the performance of such agents is strongly dependent on water chemistry such as ionic strength, pH, temperature, and the like. Furthermore, chelating agents such as citric acid at levels of 2–20 ppm do not show any threshold inhibition property against the prevalent scale, and therefore, are ineffective against such scale.

The invention herein resides in the discovery that copolymers of an acrylic acid and a substituted acrylamide are not only effective in stabilizing iron in solution but that such copolymers are also effective against scale in the presence of soluble iron. Such performance of the copolymers is unexpected since similar antiscalants are ineffective against iron in solution and their antiscalant property against the prevalent scale in an aqueous system is destroyed by the presence of the solubilized iron.

As already noted, one aspect of this invention pertains to stabilization of iron in solution, which refers to the notion of maintaining soluble iron in solution. This is distinguished from solubilization of iron, which refers to dissolution of insoluble salts or oxides of iron.

Normally, recirculating water systems contain about 1–3 ppm of soluble iron. On the scale of 1 to 10, with 10 being most effective, citric acid, polyacrylic acid, and an 80/20 copolymer of acrylic acid and t-butyl acrylamide are generally ranked approximately as follows in terms of their effectiveness against iron and the indicated scale:

| Material | Citric Acid | Polyacrylic Acid | Copolymer AA/tBAm |
|---|---|---|---|
| Calcium Carbonate | 0 | 7 | 7 |
| Calcium Sulfate | 0 | 9 | 7 |
| Calcium Phosphate | 0 | 2 | 9 |
| Iron (III) | 9 | 0 | 6 |

It should be apparent from the above tabulation that the copolymer of acrylic acid and t-butyl acrylamide is not only effective against the noted scale but is also effective for stabilizing iron in solution from precipitation. Furthermore, although not demonstrated in the above tabulation, the copolymer is also effective against the scale even in the presence of solubilized iron in solution whereas polyacrylic acid loses most of its effectiveness against the scale in the presence of iron in solution. The polyacrylic acid and other antiscalants appear to react preferentially with iron as compared to the scaling materials.

The invention described herein, therefore, is directed to threshold inhibition in typical cooling water process streams containing only iron in solution or containing iron in solution in conjunction with scaling materials. However, other process water streams which contain concentrations of ions far in excess of typical cooling water streams may also be effectively treated for scale inhibition with the copolymers of our invention in concentrations from about 1 ppm to about 200 ppm, and in some instances as high as 500 ppm, where the cost is justified. Such other process water streams include brine solutions such as are processed in desalination plants, particularly in the multiple evaporators thereof; and in brackish waters containing a high concentration of salts such as are typically encountered in membrane devices for reverse osmosis processes. Still other process water uses are in various oil field applications for scale inhibition in conduits circulating saline and oily water, where the water is present in a major amount by weight, most particularly in secondary oil recovery operations.

The aqueous systems contemplated herein contain alkaline earth metal cations such as calcium, barium, magnesium, and others, and several anions such as bicarbonate, carbonate, sulfate, phosphate, silicate, fluoride, and others. Generally, such aqueous systems contain salts selected from calcium phosphate, calcium carbonate, calcium sulfate, barium sulfate, magnesium phosphate, magnesium hydroxide, calcium silicate, magnesium silicate, iron oxide, zinc hydroxide, zinc phosphate, calcium fluoride, calcium oxalate, and mixtures of such salts. Such systems normally contain particularly the salts such as calcium carbonate, calcium phosphate, calcium sulfate, magnesium hydroxide, and mixtures thereof.

In accordance with the invention described herein, it has been discovered that copolymers of an acrylic acid and a substituted acrylamide are effective in water systems to stabilize iron and to reduce or inhibit formation and deposition of scale in presence of soluble iron in solution. The useful copolymers have molecular weight in the range of about 1,000 to 50,000, preferably about 2,000 to 20,000. The molecular weight given herein is weight average molecular weight (Mw), as measured by gel permeation chromatography. Suitable copolymers are prepared by polymerizing 40 to 95 weight parts of an acrylic acid and 5 to 60 weight parts of a substituted acrylamide. In a preferred embodiment, the copolymers are prepared by polymerizing 50 to 90 weight parts of an acrylic acid with 10 to 50 weight parts of a substituted acrylamide, the amounts being based on a total of 100 weight parts of the comonomers.

The copolymers suitable herein are random polymers containing polymerized units of an acrylic acid and substituted acrylamide, represented by the following structural formula I:

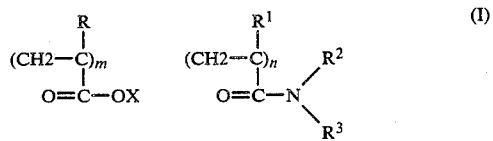

where m and n are numbers in the range of about 0.1 to 700, with m being in the range of about 10 to 700 and n is in the range of about 0.1 to 350, subject to the molecular weight limitations; R and $R^1$ are individually selected from hydrogen and methyl; X is hydrogen, alkali metal, alkaline earth metal, or ammonium, particularly hydrogen, sodium, potassium, calcium ammonium, and magnesium; and $R^2$ and $R^3$ are individually selected from hydrogen, alkyl and substituted alkyl groups each containing a total of 1 to 8 carbon atoms, provided that both $R^2$ and $R^3$ are not hydrogen although either $R^2$ or $R^3$ can be hydrogen. Substituents on the $R^2$ and $R^3$ groups include alkyl, aryl, hydroxyl, hydroxyalkyl and keto groups, however, in a preferred embodiment, $R^2$ and $R^3$ are individually selected from alkyl groups of 1 to 8 carbon atoms, preferably 1 to 6 carbon atoms, and substituted alkyl groups of 1 to 8 carbon atoms, preferably 1 to 6 carbon atoms, containing a keto and lower alkyl substituent groups. Specific examples of $R^2$ and $R^3$ include t-butyl, isopropyl, isobutyl, methyl, 2-(2,4,4-trimethylpentyl), 2-(2-methyl-4-oxopentyl), and hydroxymethyl.

It is known that acrylamide itself when copolymerized with an acrylic acid is ineffective as a phosphate scale inhibitor. Likewise, neither monomeric nor polymeric acrylic acid nor substituted monomeric or polymeric acrylamide are sufficiently effective scale inhibitors.

Suitable acrylic acids for purposes herein are generally defined as monounsaturated monocarboxylic acids containing 3 to 4 carbon atoms. Specific examples of such acids include acrylic, methacrylic and crotonic acids, with acrylic acid being preferred. Substituted acrylamides referred to herein are generally defined to include the class of acrylamides substituted on the nitrogen atom with alkyl groups each containing 1 to 8 carbon atoms.

Other comonomers can be used with an acrylic acid and a substituted acrylamide provided that such additional comonomers do not deleteriously affect the desired properties. Suitable comonomers include monomers which can be copolymerized with an acrylic acid and a substituted acrylamide. Examples of such comonomers include acrylate and methacrylate esters, acrylamide and methacrylamide, acrylonitrile, vinyl esters, etc. Amount of such comonomers can vary up to about 30 weight parts based on 100 weight parts of all polymerized monomers.

The acrylic acid units in the copolymer can be in the acid form or in a neutralized form where the hydrogen of the carboxyl group is replaced with an alkali metal, alkaline earth metal, or an ammonium cation, depending on the neutralizing medium. Generally, the copolymers can be neutralized with a strong alkali, such as sodium hydroxide, in which instance, the hydrogen of the carboxyl group of the acrylic acid units will be replaced with a sodium. With the use of an amine neutralizing agent, the hydrogen will be replaced with an ammonium group. Useful copolymers include copolymers that are unneutralized, partially neutralized, and completely neutralized.

The monomers can be prepared, if desired, in a conventional manner but they are commercially available and therefore, can be purchased. Polymerization of the monomers results in an essentially non-crosslinked random copolymer, the molecular weight of which can be adjusted with a little trial and error. The copolymer is preferably formed in a high yield ranging from about 50% to about 99% by weight of the comonomers.

It is also a requirement that the copolymer be soluble in water. Typically, the copolymer is used in water in the range of 1 to 500 ppm. Thus, high solubility of water treatment compositions is not essential but desirable. The product is preferably shipped in drums as a concentrated aqueous solution containing in the range of about 20% to about 50% by weight of solids per 100 parts of solution, which requires solubility to the extent of at least 20 weight parts per 100 weight parts of water.

In a typical polymerization process, a glass lined or stainless steel jacketed reactor is charged with predetermined amounts of monomers along with the polymerization catalyst under a nitrogen blanket, and the reaction mixture allowed to exotherm under controlled temperature conditions maintained by a heat-transfer fluid in the jacket of the reactor. The pressure under which the reaction occurs is not critical, it being convenient to carry it out under atmospheric pressure. The reaction temperature is generally in the range of 30° to 130° C.

Polymerization of the monomers identified herein can be carried out in a mutual solvent for both, such as in a hydrocarbon solvent, whether aliphatic or aromatic, in a lower alkanol of about 1 to 6 carbon atoms, or in water, with an effective amount of a free radical initiator sufficient to produce the desired composition within an acceptable period of time. The monomeric acid can be used as such or can be in a partially or completely neutralized form prior to polymerization.

The copolymer can be formed in water, an acyclic ketone, such as acetone, or in an acyclic ester, such as ethyl acetate, an alkanol, or in xylene or toluene. If, for example, the copolymer is formed in an organic solvent, or a mixture of an organic solvent and water, the copolymer is converted from the organic solvent solution to a water solution. Typically, the organic solvent is stripped from the solution with steam or distilled off with subsequent additions of water and repetition of distillation to remove the solvent, followed by the addition of water and a neutralizing agent such as caustic solution, ammonia, a hydrazine, or a low-boiling primary, secondary or tertiary aliphatic amine.

The final aqueous solution of polymer salt is preferably in the range of about pH 2 to about pH 8, with a total solids content of about 2 to about 60% by weight, and preferably about 5 to about 50% by weight of polymer in water.

The copolymers suitable herein have weight average molecular weight in the range of about 1,000 to about 50,000, and preferably about 2,000 to about 20,000, as determined by gel permeation chromatography. This determination is conventionally made according to ASTM method D-3536-76 (see ASTM Standards, Part 35, 1980), by dissolving the esterified copolymer in tetrahydrofuran and comparing with a solution in THF of polystyrene of known molecular weight. The acid numbers of the copolymers formed, as determined by a conventional titration with KOH, may range from about 310 to about 740, corresponding to a weight fraction of from 40% to about 95% by weight of monomer units having COOH groups. The preferred polymers have more than 50% by weight of free carboxyl groups and an acid number in the range from about 390 to about 700.

The copolymers described herein in connection with threshold inhibition of salt-forming scales and stabilization of iron in solution can be used in combination with other conventional additives wherever appropriate. Examples of some of the conventional additives include precipitating agents, oxygen scavengers, sequestering agents, corrosion inhibitors, antifoaming agents, and the like.

The use of copolymers described herein as suspending or dispersing agents for particulate matter, including iron oxide, has already been noted in connection with the inventors U.S. Pat. No. 4,566,973. It should be understood that effectiveness of a suspending agent is determined differently from effectiveness of a solubilizing agent. In testing a copolymer for its suspending function, an amount of iron oxide, or another particulate material, is dispersed in a volume of water containing a predetermined amount of the copolymer. The mixture is agitated and then is allowed to settle. Amount of settled iron oxide is determined by visual observation or by taking a mixture sample from the top, drying it and then weighing the suspended iron oxide. If the copolymer is an effective suspending agent, then amount of settled iron oxide will be relatively small or nil, however, if made by the drying method, amount of suspended iron oxide would be relatively large, if the copolymer is a good suspending agent.

In the determination of the effectiveness of a copolymer as a stabilizing agent, however, an aqueous solution was prepared containing an amount of copolymer and, for example, 1.0 ppm of ferric iron added in the form of ferric chloride. After mixing, pH of the solution was adjusted to 7.0. In absence of a stabilizing agent, the iron would precipitate out at this pH. The solution was then mixed again, filtered to remove any particulate matter, and amount of soluble iron (III) in the filtrate was determined by atomic absorption. It should be apparent that an effective stabilizing agent will maintain most if not all of the iron in solution.

This invention is further demonstrated by the following examples wherein a host of different materials were used to stabilize iron in an aqueous solution and to inhibit precipitation of different scales from the solution. The solutions of different compositions containing known amount of agent were prepared by admixing calcium chloride, magnesium chloride, sodium sulfate, sodium chloride, and sodium silicate. Following the addition of ferric chloride to these solutions, pH thereof was adjusted to 7.0. The solutions were filtered at end of 1 hour to 2½ hours, as noted, and amount of iron remaining in solution was determined by atomic absorption. Molecular weight (Mw) of the copolymers tested, unless otherwise specified, was on the order of 5,000 or 6,000 except that the 60/20/20 copolymer of acrylic acid, t-butyl acrylamide and methacrylic acid had weight average molecular weight of about 10,000.

EXAMPLE 1

Many different materials were tested to determine their ability to stabilize iron (III) in an aqueous solution. An aqueous solution was prepared containing the following ions in amounts indicated:

Ca=62 ppm
Mg=5.5 ppm
Na=70 ppm
Cl=126 ppm
$SO_4$=109 ppm
Si=11 ppm
Iron (III)=1.0 ppm The pH of the solution was 7.0, its temperature was room temperature of about 22° C., and time of the test was 2½ hours. Static Test Conditions were employed. After completion of the test, amount of iron in solution was determined by atomic absorption. The materials used, dosage, and amount of iron in solution are given in Table I, below:

TABLE I

| Material | Dosage ppm | % Iron (III) In Solution |
|---|---|---|
| Citric Acid | 2 | 90 |
| Sodium Hexametaphosphate | 2 | 2 |
| Polyacrylic Acid, Mw 5100 | 2 | 83 |
| Copolymer Acrylic Acid and t-Butyl Acrylamide (80/20) | 2 | 92 |
| Copolymer Acrylic Acid, t-Butyl Acrylamide and Acrylamide (80/10/10) | 2 | 97 |
| Copolymer Acrylic Acid, t-Butyl Acrylamide and Ethyl acrylate (80/10/10) | 2 | 87 |
| Copolymer acrylic Acid, t-Butyl Acrylamide and Methacrylic Acid (60/20/20) | 2 | 86 |

The results in Table I show superior effectiveness of certain materials tested in relatively dilute aqueous salt solution containing 1.0 ppm of iron in solution. Citric acid, polyacrylic acids, and copolymers of acrylic acid with substituted acrylamide were highly effective in maintaining iron in solution whereas sodium hexametaphosphate was totally ineffective.

EXAMPLE 2

This example demonstrates effectiveness of several materials in a more concentrated aqueous salt solution containing the following ions in amounts indicated:
Ca=310 ppm
Mg=28 ppm
Na=310 ppm
Cl=630 ppm
$SO_4$=545 ppm
Si=33 ppm
Iron (III) 1.0 ppm Same conditions were used as in Example 1. Results for this experiment are given in Table II, below:

TABLE II

| Material | Dosage ppm | % Iron (III) In Solution |
|---|---|---|
| Citric Acid | 2 | 92 |
| Sodium Hexametaphosphate | 2 | 0 |
| Polyacrylic Acid, Mw 2800 | 2 | 8 |
| Copolymer Acrylic Acid and t-Butyl Acrylamide (80/20) | 2 | 76 |

Here again, citric acid and the copolymer of acrylic acid with t-butyl acrylamide were highly effective in maintaining iron in solution, which was more concentrated with various salts than the solution of Example 1. Sodium hexametaphosphate, again, was totally ineffective in stabilizing iron. The unexpected occurrence here was the poor performance of the polyacrylic acid, which showed 8% iron (III) in solution. This indicates that the polyacrylic acid was incapable of stabilizing iron in a more concentrated salt solution. This contrasts sharply with the results in Example 1 where in a less concentrated aqueous salt solution, the polyacrylic acids were highly effective in stabilizing iron.

EXAMPLE 3

In this example, an even more concentrated aqueous salt solution was used than in Example 2. The particular ions and amount thereof in solution are given below:
Ca=300 ppm
Mg=300 ppm
Na=1,113 ppm
Cl=2,170 ppm
$SO_4$=700 ppm
Iron (III)=1.0 ppm Same test conditions were used as previously except that amount of solubilized iron in solution was determined after maintaining static conditions for 1 hour rather than after 2½ hours. Results of this experiment are given in Table III, below:

TABLE III

| Material | Dosage ppm | % Iron (III) In Solution |
|---|---|---|
| Citric Acid | 2 | 80 |
| Sodium Hexametaphosphate | 2 | 0 |
| Polyacrylic Acid, Mw 2100 | 2 | 7 |
| Polyacrylic acid, Mw 5100 | 2.2 | 0 |
| Copolymer Acrylic Acid and t-Butyl Acrylamide (80/20) | 2.2 | 56 |
| Copolymer Acrylic Acid, t-Butyl Acrylamide and Methacrylic Acid (60/20/20) | 2.2 | 56 |

In this example, where a highly concentrated aqueous salt solution was used containing 1.0 ppm of iron (III), citric acid again was highly effective in stabilizing iron. Sodium hexametaphosphate and polyacrylic acids were totally ineffective. Surprisingly again, the copolymers of acrylic acid with a substituted acrylamide were effective in stabilizing iron even in the highly concentrated salt solution, both copolymers posting 56% of iron in solution.

Table III demonstrates the presence of unexpected results in terms of stabilizing iron in an aqueous solution where polyacrylic acid became totally ineffective in concentrated salt solution of Example 2 and the more concentrated salt solution of Example 3 in terms of stabilizing iron. The copolymers of acrylic acid and a substituted acrylamide remained highly effective as stabilizers for iron in salt solutions in all solutions tested although they became less effective in presence of greater amounts of solubilized iron.

EXAMPLE 4

A very concentrated aqueous salt solution was used here, which corresponds to the solution of Example 3. The particular ions and amount thereof in solutions are given below:
Ca=300 ppm
Mg=300 ppm
Na=1,113 ppm
Cl=2,170 ppm
$So_4$=700 ppm
Iron (III)=1.0 ppm The same test conditions were used as in Example 3 except that amount of solubilized iron in solution was determined after maintaining static conditions for 2 hours and dosage of the materials was 2.2 ppm. Results of this experiment are given in Table IV, below:

TABLE IV

| Material | Dosage ppm | % Iron (III) In Solution |
|---|---|---|
| 70/30 Copolymer of Acrylic Acid and Acrylamide | 2.2 | 0 |
| 80/20 Copolymer of Acrylic Acid and Acrylamide | 2.2 | 9 |
| 80/20 Copolymer of Acrylic Acid and Diacetone Acrylamide | 2.2 | 25 |
| 60/40 Copolymer of Acrylic | 2.2 | 65 |

TABLE IV-continued

| Material | Dosage ppm | % Iron (III) In Solution |
|---|---|---|
| Acid and Dimethyl Acrylamide | | |
| 80/20 Copolymer of Acrylic Acid and t-Octyl Acrylamide | 2.2 | 0 |
| 80/20 Copolymer of Acrylic Acid and t-Butyl Acrylamide | 2.2 | 58 |
| 80/20 Copolymer of Acrylic Acid and i-Propyl Acrylamide | 2.2 | 75 |
| 46/54 Copolymer of Methacrylic Acid and N—Methylol Acrylamide | 2.2 | 58 |

Results in Table IV, above, confirm ineffectiveness of the copolymers of acrylic acid and acrylamide. The copolymers of acrylic acid with substituted acrylamides were effective although stabilization of iron by the copolymer of acrylic acid and t-octyl acrylamide was surprisingly negligible. It is, nevertheless, believed that the copolymers of acrylic acid and t-octyl acrylamide can be rendered effective in stabilizing iron by varying factors such as composition and molecular weight thereof.

EXAMPLE 5

This example demonstrates effectiveness of various copolymers of acrylic acid as antiscalants against calcium phosphate scale in presence and absence of 1 ppm of soluble iron. The copolymers were used to treat water containing calcium and phosphate ions, and in some cases, ferric ions, in a stirred pH-stat test while maintaining constant pH and using an automatic titrator to monitor the effectiveness of the copolymers for inhibiting the precipitation of calcium phosphate. The solution contained 10 ppm of copolymer, had pH of 8.5, phosphate ion concentration of 9.1 ppm, calcium ion concentration of 140 ppm, temperature of 50° C., and duration of the test was 22 hours.

Results of these tests are given in percent threshold inhibition for calcium phosphate scale. The results are indicative of the effectiveness of a copolymer in preventing precipitation or deposition of the scale. Stated differently, threshold inhibition is a measure of a copolymer's ability to maintain in solution calcium phosphate which, in absence of the copolymer, would precipitate and deposit in a system. The higher the number, the better. A 100% threshold inhibition means that the copolymer was able to prevent precipitation of all of the calcium phosphate that, in absence thereof, would precipitate. The results given below in Table IV provide threshold inhibition of calcium phosphate using various copolymers in absence and in presence of 1 ppm of solubilized iron (III). The results, in effect, demonstrate iron interference with threshold inhibition of calcium phosphate.

TABLE V

| | % TI of Calcium Phosphate | |
|---|---|---|
| | Iron (III) In Solution | |
| | 0 ppm | 1 ppm |
| 1. 80/20 Copolymer of Acrylic Acid and t-Butyl Acrylamide | 83 | 42 |
| 2. 80/10/10 Copolymer of Acrylic Acid, t-Butyl Acrylamide, and Acrylamide | 83 | 28 |
| 3. 80/10/10 Copolymer of Acrylic Acid, t-Butyl Acrylamide, and Ethyl Acrylate | 56 | 10 |
| 4. 60/20/20 Copolymer of Acrylic Acid, t-Butyl Acrylamide, and Methacrylic Acid | 80 | 36 |
| 5. 80/20 Copolymer of Acrylic Acid and Vinyl Acetate | 95 | 23 |
| 6. 63/37 Copolymer of Acrylic Acid and Hydroxypropyl Acrylate | 55 | 17 |

Table V gives percent threshold inhibition of the calcium phosphate scale using various copolymers of acrylic acid as antiscalants at a level of 10 ppm. The copolymer of acrylic acid and t-butyl acrylamide, in weight ratio of 80/20, had threshold inhibition of 83%, in terms of calcium phosphate, when the solution was devoid of soluble iron (III). In the presence of 1 ppm of iron (III), however, threshold inhibition of the copolymer against the same scale was 42%. The copolymer of acrylic acid, t-butyl acrylamide and acrylamide had respective threshold inhibition of 83% and 28%. The copolymer of acrylic acid, t-butyl acrylamide and ethyl acrylate had a disappointing threshold inhibition of 56% and 10%, however, a similar copolymer where ethyl acrylate was substituted with methacrylic acid, had a very satisfactory threshold inhibition of 80% and 36%. Copolymer of acrylic acid and vinyl acetate had respective threshold inhibition of 95% and 23%, which is indicative of a copolymer which is a very effective antiscalent in absence of iron (III) but which loses most of its activity as an antiscalent in presence of iron (III). The last antiscalant tested was a copolymer of acrylic acid and hydroxypropyl acrylate which yielded a disappointing threshold inhibition of 55% and 17%, the reason for which is not known.

With the exception of the copolymer of acrylic acid, t-butyl acrylamide and ethyl acrylate, the other copolymers of an acrylic acid and substituted acrylamide demonstrated a high threshold inhibition against calcium phosphate scale in absence of solubilized iron which is substantially retained even in the presence of solubilized iron. Based on the data presented herein, the substantial retention of the antiscalant property in presence of solubilized iron by the copolymers of acrylic acid and substituted acrylamide is totally surprising and unexpected.

It has been shown here that copolymers of an acrylic acid and a substituted acrylamide can maintain iron in solution and thus prevent its precipitation and deposition on internal surfaces of tanks, pipes and equipment. It has also been shown that the copolymers remain effective as antiscalants even in the presence of soluble iron whereas other similar materials lose their antiscalant property in the presence of soluble iron. Typical scales encompassed by the present invention include calcium carbonate, calcium phosphate, calcium sulfate, and magnesium hydroxide.

The copolymers described herein can be used in aqueous recirculating systems where the copolymers are effective in delaying deposition of iron in its myriad forms as the content of iron in the system increases with time. When an intolerable concentration of iron in the system is reached, additional copolymer can be added, however, at some point in time, the system is shut down and the aqueous phase is either replaced with a fresh aqueous phase or else the concentrated phase is treated to remove iron and any other particulate matter. The concentrated aqueous phase can also be slowly withdrawn and replaced with fresh water. In a reverse osmosis system, wherein the copolymers can be used, concentration of particulate iron is monitored until a point is reached when the system cannot operate due to the presence of excessive iron in the system. At that time, the membranes are treated to reduce or remove iron content before placing them again in operation. In such reverse osmosis systems, it is desired to have not more than about 1-5 ppm soluble iron (III) in the aqueous phase.

We claim:

1. A method for maintaining iron stabilized in an aqueous system containing soluble iron and for inhibiting precipitation of phosphate scale, the method comprising the step of adding to said aqueous system 0.05 to 500 ppm of a water-soluble non-crosslinked random copolymer of 50 to 90 weight parts of an acrylic acid and 10 to 50 weight parts of substituted acrylamides, on the basis of a total of 100 weight parts of all monomers polymerized, said copolymer having weight average molecular weight of about 1,000 to 50,000 and the polymerized units of said acrylic acid and said substituted acrylamides are defined by the following formulas:

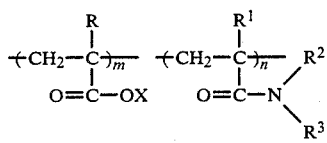

where m is in the range of about 10 to 700 and n is in the range of about 0.1 to 350, subject to the molecular weight limitation; R and $R^1$ are individually selected from hydrogen and methyl; X is selected from hydrogen, sodium, potassium, calcium, ammonium, and magnesium moieties; and $R^2$ and $R^3$ are individually selected from hydrogen and substituted and unsubstituted groups each containing a total of 1 to 8 carbon atoms, wherein the substituents on $R_2$ and/or $R^3$ are selected from alkyl, aryl, and keto groups, provided that either $R^2$ and/or $R^3$ is other than hydrogen.

2. Method of claim 1 wherein said aqueous system is a recirculating water system containing at least about 1 ppm of soluble iron (III).

3. Method of claim 1 wherein amount of said copolymer in said aqueous system is about 1 to 200 ppm and said copolymer has molecular weight in the range of 2,000 to 20,000.

4. Method of claim 3 wherein said acrylic acid is selected from acrylic acid itself and methacrylic acid; said substituted acrylamides are selected from diacetone acrylamide, N,N-dialkylacrylamides, and N-monoalkylacrylamides containing 1 to 8 carbons in each alkyl group; and said aqueous system has pH of about 5 and above.

5. Method of claim 3 wherein said copolymer contains up to about 30 weight parts of one or more other suitable monomers copolymerizable with said acids and said substituted acrylamides, based on 100 weight parts of all monomers.

6. Method of claim 5 wherein said other suitable monomers are selected from acrylamide, methacrylamide, acrylonitrile, vinyl esters, and mixtures thereof.

7. Method for inhibiting the precipitation of phosphate scale in an aqueous system also containing solubilized iron, the method comprising the step of adding to said aqueous system 0.05 to 500 ppm of a water-soluble non-crosslinked random copolymer of 50 to 90 weight parts of an acrylic acid and 10 to 50 weight parts of substituted acrylamides, on the basis of a total of 100 weight parts of all monomers, said copolymer having weight average molecular weight of about 1,000 to 50,000 and the polymerized units of said acrylic acid and said substituted acrylamide are defined by the following formulas:

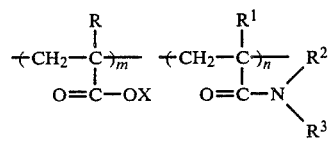

where m is in the range of about 10 to 700 and n is in the range of about 0.1 to 350, subject to the molecular weight limitation; R and $R^1$ is selected from hydrogen and methyl; X is selected from hydrogen, sodium, potassium, calcium, ammonium, and magnesium moieties; and $R^2$ and $R^3$ are individually selected from hydrogen and substituted and unsubstituted groups each containing a total of 1 to 9 carbon atoms, wherein the substitutents on $R^2$ and/or $R^3$ are selected from alkyl, aryl hydroxyl, hydroxyalkyl, and keto groups, provided that either $R^2$ and/or $R^3$ is other than hydrogen.

8. Method of claim 7 wherein the aqueous system is a recirculating water system containing at least about 1 ppm of soluble iron (III), the amount of said copolymer in said aqueous system is about 1 to 200 ppm, and said copolymer has molecular weight in the range of 2,000 to 20,000.

9. Method of claim 7 wherein said copolymer contains up to about 30 weight parts of one or more other suitable monomers copolymerizable with said acids and said substituted acrylamides, based on 100 weight parts of all monomers to be polymerized.

10. Method of claim 9 wherein said acrylic acid is selected from acrylic acid itself and methacrylic acid; said substituted acrylamides are selected from diacetone acrylamide, N,N-dialkylacrylamides, and N-monoalkylacrylamides containing 1 to 8 carbons in each alkyl group; and said aqueous system is at pH of about 5 and above and contains 1 to 5 ppm of solubilized iron (III) as well as scales selected from the group consisting of calcium carbonate, calcium phosphate, calcium sulfate, magnesium hydroxide, and mixtures thereof.

11. Method of claim 9 wherein said other suitable monomers are selected from acrylamide, methacrylamide, acrylonitrile, vinyl esters and mixtures thereof.

12. Method of claim 7 wherein said copolymer is selected from an 80/20 copolymer of acrylic acid and t-butyl acrylamide, and an 60/20/20 copolymer of acrylic acid, t-butyl acrylamide, and methacrylic acid, on weight percent basis.

* * * * *

UNITED STATES PATENT AND TRADEMARK OFFICE
CERTIFICATE OF CORRECTION

PATENT NO. : 4,707,271

DATED : November 17, 1987

INVENTOR(S) : Zahid Amjad and William F. Masler, III

It is certified that error appears in the above—identified patent and that said Letters Patent is hereby corrected as shown below:

Column 12, line 33, "1 to 9 carbon atoms," should read -- 1 to 8 carbon atoms, --.

Signed and Sealed this

Third Day of January, 1989

Attest:

DONALD J. QUIGG

Attesting Officer

Commissioner of Patents and Trademarks